United States Patent
McNeilly et al.

[11] Patent Number: 5,260,812
[45] Date of Patent: Nov. 9, 1993

[54] CLOCK RECOVERY CIRCUIT

[75] Inventors: Peter J. McNeilly; Joseph P. Maune; Elliot D. Macomber, all of Rochester, N.Y.

[73] Assignee: Eastman Kodak Company, Rochester, N.Y.

[21] Appl. No.: 798,465

[22] Filed: Nov. 26, 1991

[51] Int. Cl.$^5$ ............................................. H04N 5/04
[52] U.S. Cl. .................................. 358/479; 358/148; 358/149
[58] Field of Search ............... 358/148, 149, 158, 188, 358/183, 479

[56] References Cited

U.S. PATENT DOCUMENTS

| | | | |
|---|---|---|---|
| 4,222,074 | 9/1980 | Breithaupt | 358/149 |
| 4,654,708 | 3/1987 | de la Guardia et al. | 358/149 |
| 5,005,079 | 4/1991 | Satomi | 358/148 |

FOREIGN PATENT DOCUMENTS 0442081 8/1991 European Pat. Off.
2175470A 11/1986 United Kingdom.

*Primary Examiner*—Edward L. Coles, Sr.
*Assistant Examiner*—Jerome Grant, II
*Attorney, Agent, or Firm*—William F. Noval

[57] ABSTRACT

A medical imaging system includes a video interface connecting different medical imaging modalities to a laser printer. The video interface includes a clock recovery phase-lock-loop (PLL) as a frequency synthesizer video signal from a modality. A second PLL inserts a pulse train equal to the horizontal frequency into an analog video signal having a vertical sync interval with no serrating pulses. This assures the clock recovery PLL will maintain lock during the vertical sync interval.

4 Claims, 4 Drawing Sheets

CLOCK RECOVERY CIRCUIT

FIELD OF INVENTION

This invention relates in general to medical imaging systems and more particularly to an interface between a medical imaging modality and a radiographic printer.

BACKGROUND OF THE INVENTION

In traditional film/screen medical diagnostic imaging, an anatomical part of a patient is positioned between an x-ray source and an unexposed film/screen, an x-ray exposure of the anatomical part produces a latent x-ray image in the film and the film is developed. The developed x-ray film is then viewed on a light box by a diagnostician (radiologist/physician). More recently, medical diagnostic imaging modalities, such as CT and MRI scanners, have produced video x-ray images which are viewed on a video monitor. Frequently, a permanent x-ray image of a video x-ray image is made by photographing the video monitor to produce an x-ray film image. The x-ray film image can also be produced by a laser printer (such as the KODAK EKTASCAN LASER PRINTER sold by the Eastman Kodak Company, Rochester, N.Y.).

When using a laser printer to produce a permanent x-ray film image, problems arise from the different video formats used by different medical imaging modalities. Typically, the analog video signal produced by the modality is converted to a digital image signal which is used to drive the laser printer.

Because some incoming video formats lack serrating pulses during the vertical sync time interval, when a phase-locked-loop (PLL) is used as a frequency synthesizer to recover a pixel clock from a composite video signal, the clock recovery circuitry will lose lock if no serrating pulses are present. The signal compensating and PLL circuits disclosed in the following patents are not entirely suitable for such applications.

U.S. Pat. No. 4,251,833, issued Feb. 17, 1981, inventors Fernsler et al.

U.S. Pat. No. 4,905,085, issued Feb. 27, 1990, inventor Faulhaber.

U.S. Pat. No. 4,520,394, issued May 28, 1985, inventor Kaneko.

U.S. Pat. No. 4,851,910, issued Jul. 25, 1989, inventors Kawai et al.

U.S. Pat. No. 3,469,032, issued Sep. 23, 1969, inventors Dorsey et al.

U.S. Pat. No. 3,991,270, issued Nov. 9, 1976, inventors van Straaten et al.

U.S. Pat. No. 4,709,268, issued Nov. 24, 1987, inventors Akimoto et al.

U.S. Pat. No. 4,945,413, issued Jul. 31, 1990, inventors Merval et al.

U.S. Pat. No. 4,379,309, issued Apr. 5, 1983, inventors Berke et al.

U.K. Patent Application GB 2086177A, published May 6, 1982, inventors Yamazaki et al.

SUMMARY OF THE INVENTION

According to the present invention, there is provided a circuit for generating a pulse train equal to the horizontal scan frequency during the vertical sync interval of a video signal which has no serrating pulses during such interval. The circuit includes a phase-lock-loop clock recovery circuit for providing a pixel clock synchronized to the horizontal frequency of an analog video signal to be digitized and a multiplexer having first and second inputs. A second phase-lock-loop circuit is connected to the second input and the analog video signal composite sync is applied directly to the first input and to the second phase-lock-loop circuit. Control means controls the multiplexer as follows:

When an analog video signal is received which has serrating pulses during the vertical sync interval, the multiplexer is controlled to pass it directly from the first input to the clock recovery phase lock loop circuit. When an analog video signal is received which has no serrating pulses during the vertical sync interval, the second PLL is controlled to insert serrating pulses at the horizontal frequency into the vertical sync interval of the analog video signal. The multiplexer is controlled to pass the enhanced analog video signal from the second input to the clock recovery PLL. In this manner, the clock recovery PLL is prevented from losing lock no matter which kind of analog video signal is received.

DESCRIPTION OF THE PREFERRED EMBODIMENTS

Figure 1:
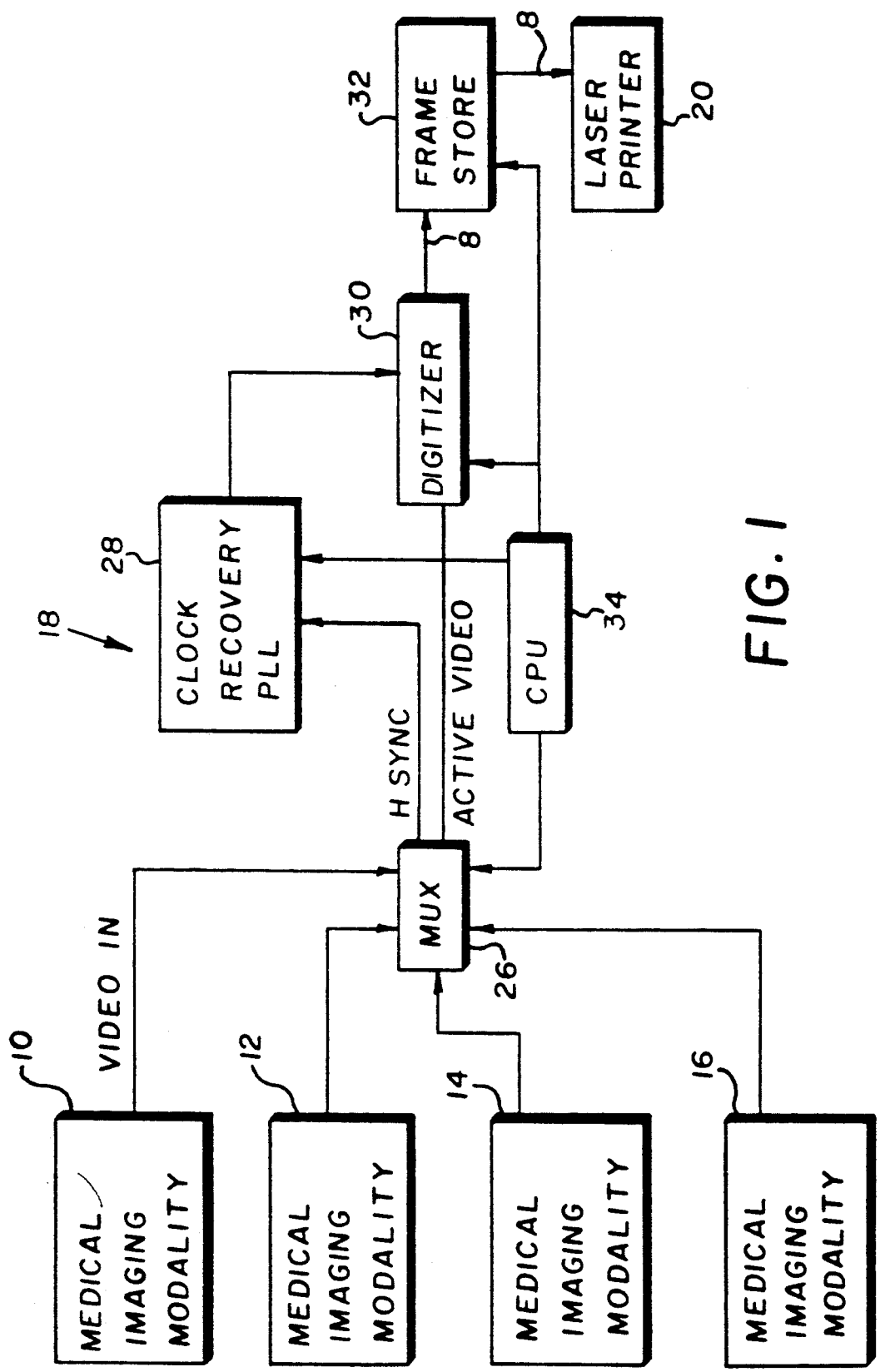
FIG. 1 is a block diagram of a medical imaging system including an embodiment of the present invention.

Referring now to the Figures, there will be described an embodiment of the present invention as used in a medical imaging system. It will be understood that the present invention can also be used in other imaging systems in which an analog video signal is converted to a digital image signal. The medical imaging system in FIG. 1 includes medical imaging modalities 10, 12, 14, 16 (such as CT, MRI, US, PET), video interface 18 and laser printer 20. Modalities 10, 12, 14, 16 produce x-ray analog video images which are applied to inputs 21, 22, 23, 24 of video multiplexer (MUX) 26 of video interface 18. Video interface 18 includes clock recovery PLL 28, digitizer 30, frame store 32 and control processor unit (CPU) 34. CPU 34 enables MUX 26 to pass a video signal from only one of modalities 10, 12, 14, 16 to digitizer 30 where the active video is converted from an analog image to a digital image. The horizontal sync is applied to PLL 28 which produces the pixel clock for digitizer 30. The digital image is stored in frame store 32 before it is applied to laser printer 20 to produce a hardcopy x-ray film image. Other types of printers, such as thermal printers or cathode ray tube printers, can also be used to produce a hard copy x-ray image.

Figure 2:
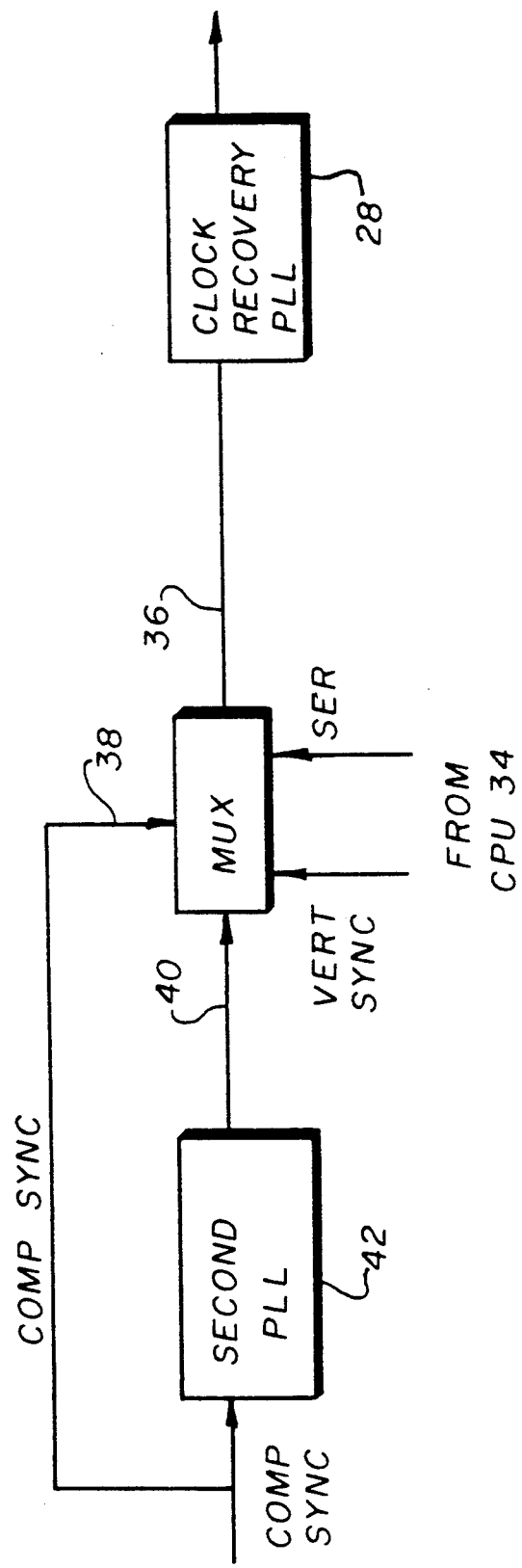
FIG. 2 is a schematic diagram of the embodiment of FIG. 1.
Figure 3:
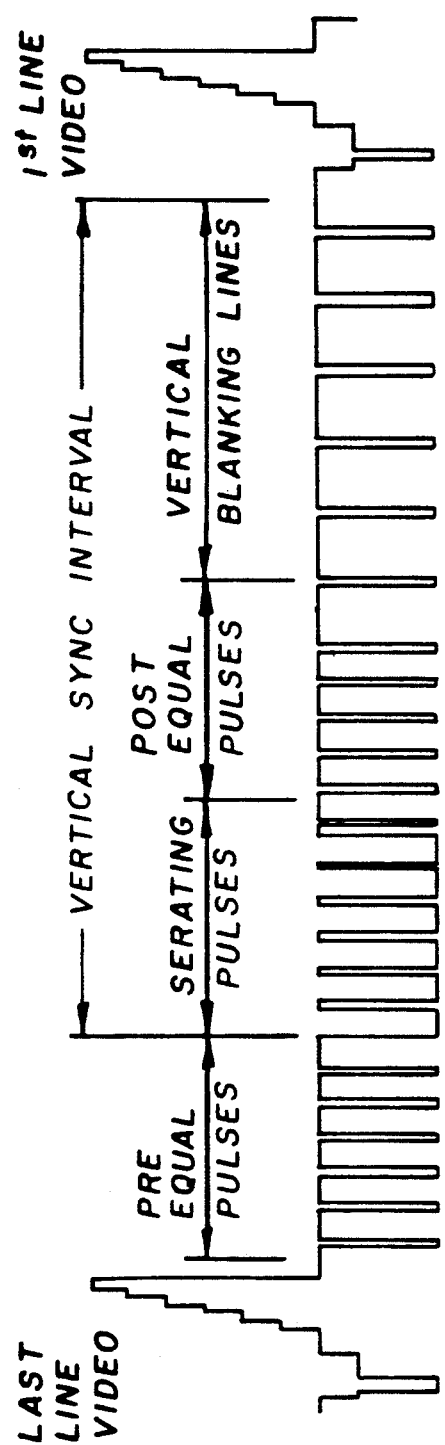
FIGS. 3 and 4 are waveform diagrams useful in describing operation of the present invention.
Figure 4:
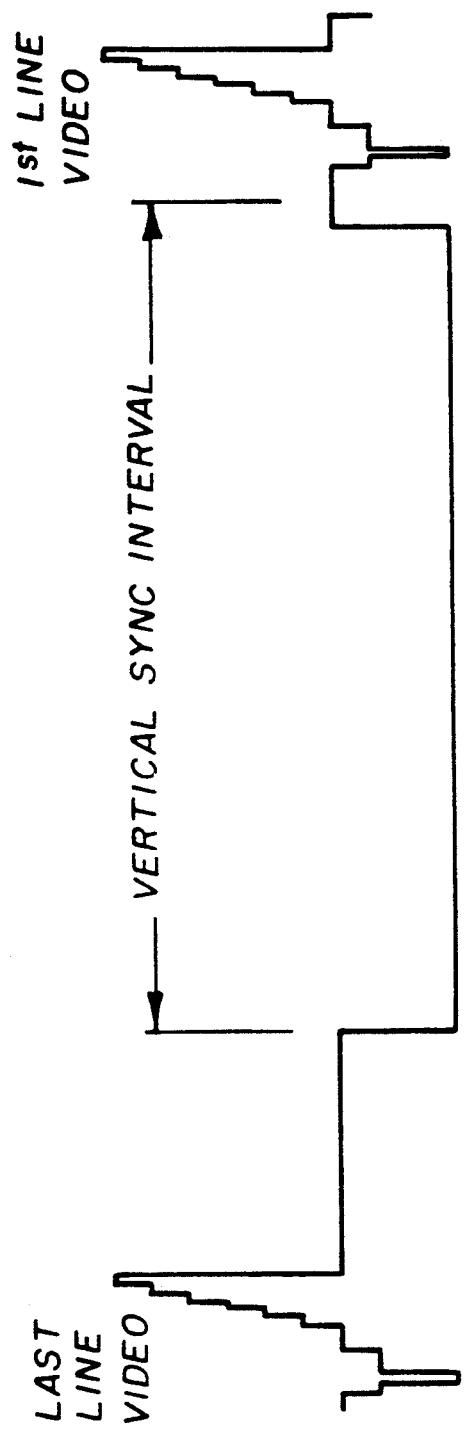

Referring now to FIGS. 2–4, there will be described an embodiment of the present invention. As shown, MUX 26 includes a multiplexer circuit 36 having first and second inputs 38 and 40. A second phase-lock-loop (PLL) 42 is connected to input 40 and generates a pulse train equal to the horizontal frequency of a received analog video signal having no serrating pulses during the vertical sync interval.

When a modality 10–16 provides an analog video signal to MUX 26 (FIG. 1) which has a vertical sync interval with serrating pulses at horizontal frequency (FIG. 3), CPU 34 controls multiplexer circuit 36 of MUX 26 to pass the analog video signal at input 38 directly to clock recovery PLL 28. PLL 28 will stay in lock during the vertical sync interval due to the serrating pulses present during this interval. When a modality 10-16 provides an analog video signal to MUX 26 (FIG. 1) which has a vertical sync interval with no serrating pulses, CPU 34 controls PLL 42 to insert a pulse train at horizontal frequency into the vertical sync interval of the analog video signal. CPU 34 controls multiplexer circuit 36 to pass the enhanced analog video signal at input 40 to clock recovery PLL 28. This assures that the PLL 28 will remain in lock condition during the vertical time interval.

Industrial Applicability

The invention has applicability in medical imaging systems in which analog video signals with different formats from medical imaging modalities are provided to a radiographic laser printer to produce radiographic film.

Although the invention has been described with reference to preferred embodiments thereof, it will be understood that variations and modifications can be effected within the spirit and scope of the invention as described above as defined in the appended claims.

What is claimed is:

1. A clock recovery circuit comprising:
   means for receiving either a first analog video signal having a vertical sync interval with serrating pulses at horizontal frequency or a second analog video signal having a vertical sync interval with no serrating pulses at horizontal frequency;
   a clock recovery phase-lock-loop (PLL) for producing a pulse train synchronized with the horizontal frequency of a received analog video signal.
   a multiplexer having first and second input signals wherein said first input directly receives an analog video signal, and wherein a second phase-lock-loop (PLL) circuit produces a pulse train at the horizontal frequency of a received analog video signal and is connected to said second input of said multiplexer;
   control means for controlling said multiplexer, (1) when an analog video signal is received having a vertical sync interval with serrating pulses at horizontal frequency, said signal is passed from said first input directly to said clock recovery PLL, and (2) when an analog video signal is received having a vertical sync interval with no serrating pulses at horizontal frequency, said second PLL inserts a pulse train at horizontal frequency into said vertical sync interval of said analog video signal, and said enhanced analog video signal is passed from said second input to said clock recovery PLL, to assure synchronization of said clock recovery PLL with said analog video signal during the vertical sync interval.

2. The circuit of claim 1 wherein said first and second video signals are received from different medical image modalities.

3. The circuit of claim 1 wherein said clock recovery PLL effects recovery of the pixel clock of said received analog video signal and including a digitizer, which is synchronized with said recovered pixel clock and which converts the active video of said received analog video signal into a digital video signal.

4. The circuit of claim 3 wherein said digital video signal is applied to a laser printer which produces a film image of said video signal.

* * * * *